United States Patent [19]
Carson

[11] 3,877,624
[45] Apr. 15, 1975

[54] VEHICLE TOP RACK

[76] Inventor: Miles Thomas Carson, 1120 10th St., Denver, Colo. 80204

[22] Filed: May 13, 1974

[21] Appl. No.: 469,603

[52] U.S. Cl......... 224/42.1 F; 24/263 A; 224/42.4; 224/42.45 R; 248/316 R; 248/361 R; 269/135
[51] Int. Cl............................................. B60m 9/04
[58] Field of Search...... 224/42.1 F, 42.1 E, 42.1 R, 224/42.1 H, 42.1 G, 29 R, 42.45 R, 42.43, 42.38, 42.4; 248/361 B, 361 R, 316 A, 316 B, 316 R; 24/263 A, 263 LS, 248 SA; 269/135; 214/450

[56] References Cited
UNITED STATES PATENTS

| | | | |
|---|---|---|---|
| 1,568,122 | 1/1926 | Zifferer | 269/135 X |
| 2,480,353 | 8/1949 | Bjork | 224/42.1 F |
| 3,058,607 | 10/1962 | Kiley | 214/450 |
| 3,251,519 | 5/1966 | Jones | 224/42.1 F |

*Primary Examiner*—Robert J. Spar
*Assistant Examiner*—Jerold M. Forsberg
*Attorney, Agent, or Firm*—Harold L. Stowell

[57] ABSTRACT

A vehicle top rack, particularly for transporting elongate objects such as ladders, having positive clamping means which automatically adjusts itself, during actuation thereof, to accommodate for the width and height of the elongate object to be clamped to the rack. In a preferred embodiment, the top rack includes three transverse bows with the novel clamping means on the center bow so that the rack will also accommodate ladders and the like of a plurality of lengths.

7 Claims, 11 Drawing Figures

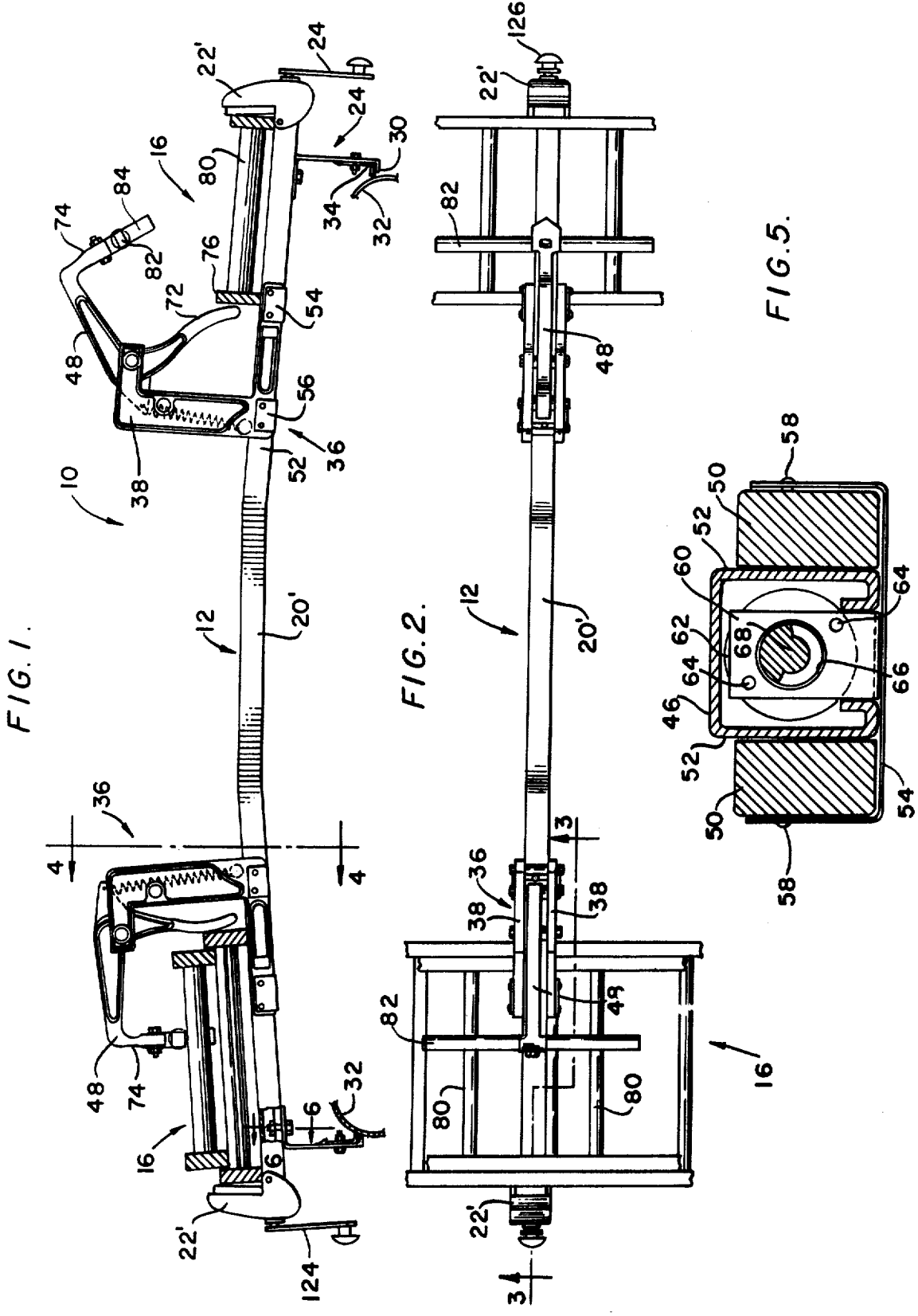

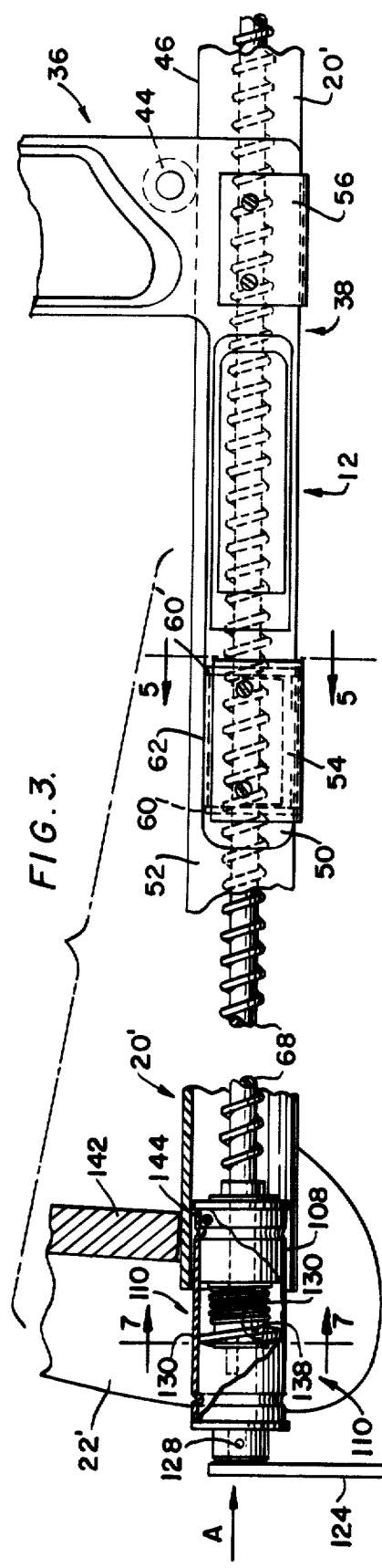
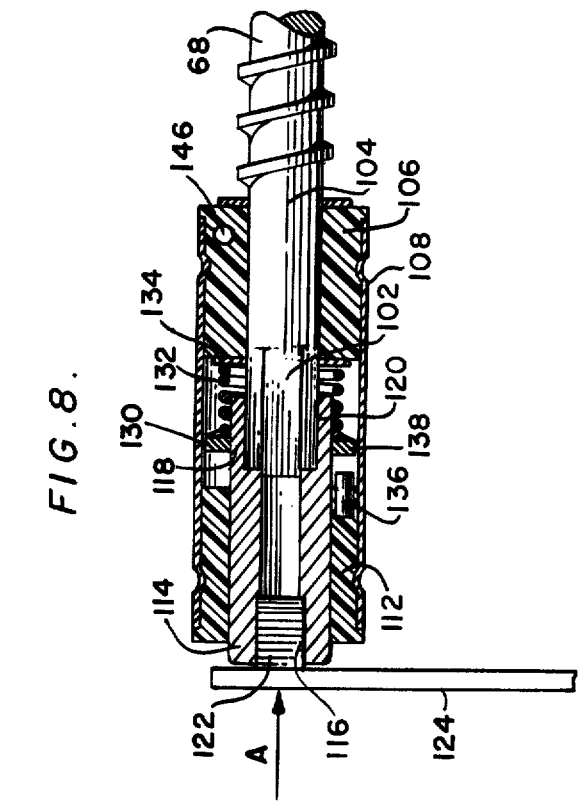
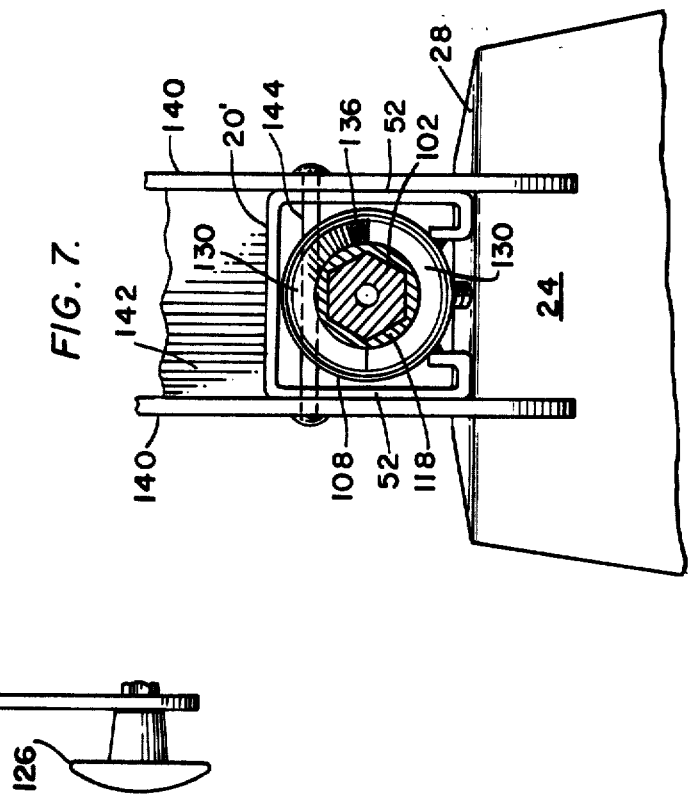

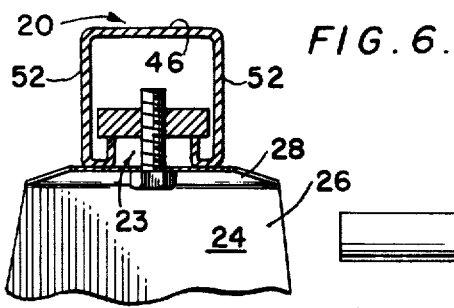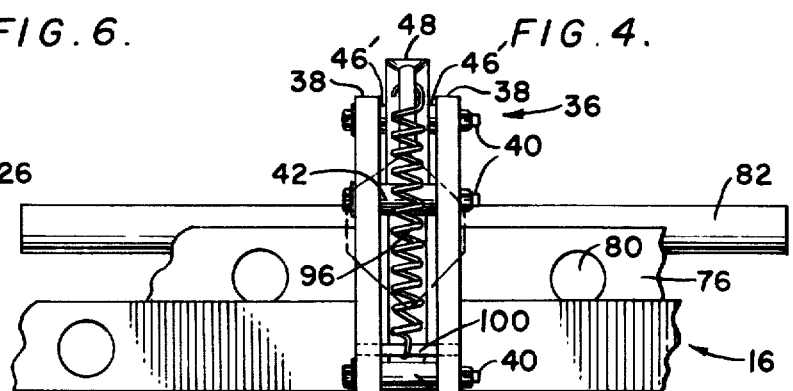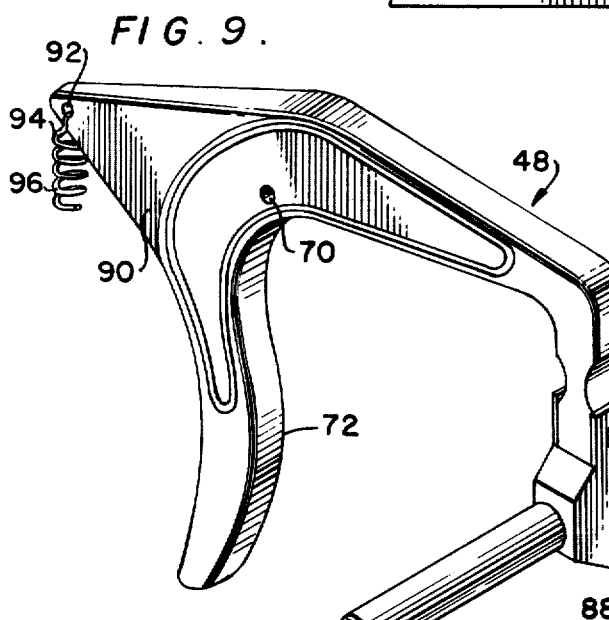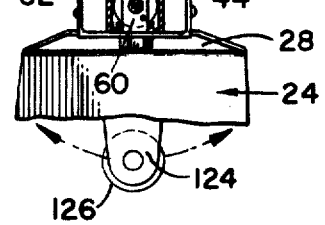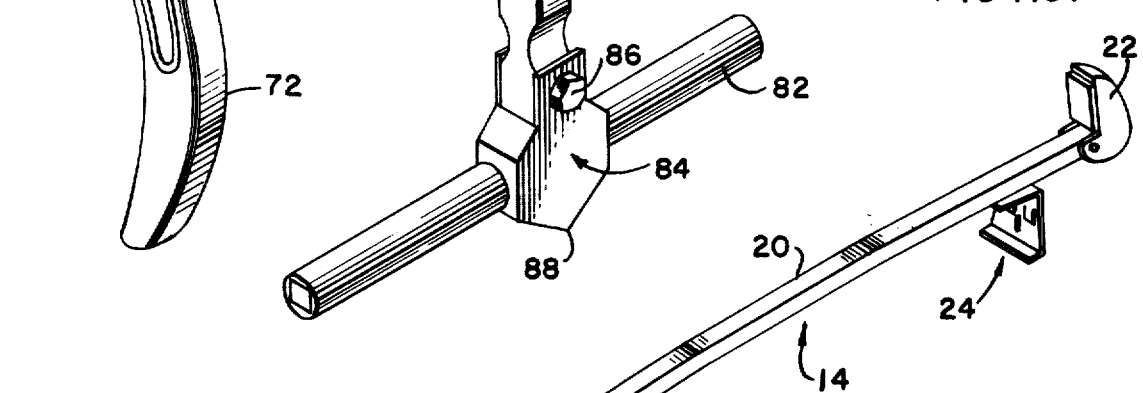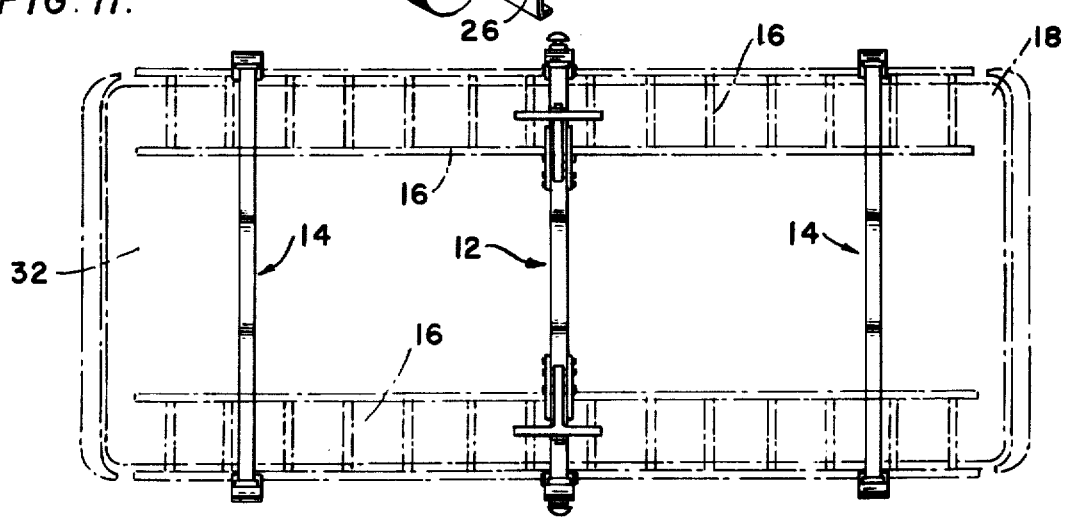

VEHICLE TOP RACK

BACKGROUND OF THE INVENTION

Panel trucks, station wagons and the like automotive vehicles are often employed to transport ladders and other elongate, relatively heavy items. The provision of positive clamping means for vehicle top racks have long been a problem as the width of different ladders may vary as well as their height and length. Such problems are compounded if the rack is to be suitable for both single and double ladders. Further, it is necessary to very positively secure such elongate items against side, forward and rearward thrusts which are amplified during acceleration, deceleration and turning of the ladder carrying vehicles.

OBJECTS OF THE INVENTION

It is therefore a primary object of the invention to provide a ladder transporting means including a vehicle top rack having improved clamping means that is versatile in use, simple to operate, positive in actuation, and which will accommodate ladders having a substantial range of widths and heights and lengths.

A further object is to provide a clamp associated with a vehicle top rack wherein the clamped object is positively prevented from shifting in any direction.

Another object is to provide such a clamp wherein accidental release of the clamping means is minimized by a crank provided with a clamp release ratchet mechanism.

A further object is to provide such a clamp that can be operated by a single operator.

Another object is to provide an elongate object carrying rack and clamping means therefor that does not weight materially more than conventional prior art devices and which may be readily manufactured without departing from standard construction methods.

These and other objects and advantages are provided by an improved vehicle top elongate object transporting structure comprising:

at least a pair of bows, each of said bows having means for attaching said bows to the top of a vehicle in longitudinally spaced relation;

each of said bows having an upstanding stop member immovably mounted at at least one end thereof; and at least one of said bows mounting a transversely movable clamp member comprising:

a. a crank mounted for rotation in the end of said bow;

b. a lead screw mounted for rotation in said bow and engageable by said crank;

c. a slide frame engaging the bow and forming a part of the movable clamp member;

d. a threaded follower engaging the lead screw and mounted in said slide frame;

e. a generally U-shaped clamp arm having first and second legs; means pivotally mounting the clamp arm to the slide frame such that the legs of the arm depend toward the bow;

f. a spring having one end connected to the slide frame and the other end connected under tension to the U-shaped clamp arm adjacent the first leg or urge the first and second legs thereof away from the bow and about the pivotal connection between the clamp arm and the slide frame, so as to be pivoted in the opposite direction against the urging of the spring by contact of the first leg by an edge of an elongate object to be clamped to the bows when the slide frame is urged toward the elonate member to be transported; and g. foot means carried by the free end of the second leg to engage the top surface of the elongate object to be transported when the clamp arm is in the clamping position.

The invention will be more particularly described in reference to the accompanying drawings wherein:

FIG. 1 is a fragmentary elevational view of the clamp carrying bow of the vehicle top elongated object transporting structure of the invention;

FIG. 2 is a top plan view of the structure shown in FIG. 1;

FIG. 3 is an enlarged fragmentary sectional view on line 3—3 of FIG. 2;

FIG. 4 is a fragmentary section on line 4—4 of FIG. 1;

FIG. 5 is a section on line 5—5 of FIG. 3;

FIG. 6 is a section on line 6—6 of FIG. 1;

FIG. 7 is a section on line 7—7 of FIG. 3;

FIG. 8 is an enlarged fragmentary partial sectional view through a portion of the structure shown in FIG. 3;

FIG. 9 is a perspective view of a portion of the clamping arm mechanism of the invention;

FIG. 10 is a perspective view of another of the bows of the object transporting structures of the invention; and FIG. 11 is a top plan view of a system of three bows mounted on a transporting vehicle with the vehicle and the elements being transported shown in broken lines.

Referring to the drawing, 10 generally designates a vehicle top elongate object transporting structure particularly useful for transporting ladders, scaffolding members, etc. and the structure comprises at least a pair of bows and preferably three bows, at least one of which is provided with the novel clamping mechanism of the invention.

In the drawings, the clamping bows are generally designated 12 and the non-clamping bows are generally designated 14. In FIG. 11, a particularly useful arrangement of a pair of bows 14 and a single clamping bow mounted therebetween is shown with ladder 16 shown ladders 16 broken lines and the vehicle body 18 similarly illustrated.

While the arrangement shown in FIG. 11 is particularly useful and advantageous as the structures shown will support relatively long ladders or the like so that the ladder is clamped adjacent its center with the ladder ends extending and being supported by each of the end bows 14 or when supporting a shorter ladder, the ladder is clamped via the center clamping bow 12 to extend either toward the rear or the front of the vehicle for support on one of the non-clamping bows 14. It will be appreciated, however, that only two bows, one clamping and one non-clamping may be used or both of a pair of bows may have the clamping structures of the invention or further, that each of the three or more bows may have active clamping means associated therewith.

Referring particularly to FIG. 10 showing in perspective one of the non-clamping bows 14, the bow consists of a channel or rail member 20 having secured at each end thereof an upstanding immovable stop member 22. Intermediate the ends of the channel member 20 are mounted a pair of roof attaching brackets 24 having lower flanges 26 which, for example, fit under a conventional gutter rail 30 of the roof structure 32 as shown in FIG. 1 of the drawings and an upper flange 28 which is secured to the undersurface of the transverse rail or channel member 20 by a conventional bolt and nut assembly 23. The brackets 24 may be secured to the gutter rail by a wedge clamp half 34, also shown in FIG. 1, or other forms of attaching means may be employed, such as that shown and described in my copending patent application Ser. No. 468,141 filed May 8, 1974.

Each of the clamping bows 12 of the assembly may have elongate object clamping structures adjacent either or both of the ends of the bow. In the illustrated form of the invention, clamping mechanisms are illustrated at both ends of the bow which are identical in form and construction, therefore both of the structures will be simultaneously described.

The clamping bow 12 is comprised of a channel or rail member 20' which, as more clearly shown in, for example, FIG. 7 of the drawing, comprises a hollow generally U-shaped channel member. The rail or channel member 20' has immovably secured at each end a stop member 22' which stop members are secured to the side walls of the channel 20' by rivet or pin as to be more fully described hereinafter.

Each of the clamping bows 20' supports a pair of transversely movable clamp members generally designated 36. Each of the members 36 comprises a pair of spaced generally U-shaped slide frames 38 which are maintained in spaced relation by suitable fasteners 40 illustrated as bolts and nuts, a spacer 42, a combination spacer-roller 44 and a pair of spacers 46' which engage opposite sides of a generally U-shaped clamping arm generally designated 48. The combination spacer-roller 44 engages the top surface 46 of the channel member 20', as more clearly shown in FIGS. 3 and 4 of the drawing.

The right and left legs 50 of the slide frames 38 engage the right and left outer surfaces of the channel member 20' as more clearly shown in FIG. 5 and are maintained in their proper relationship therewith by U-shaped brackets 54 at the forward end and 56 at the rearward end, which brackets are secured to their respective legs 50 by bolts 58. The forward U-shaped brackets 54 also include a cradle having a plate 60 which fits within the confines of the channel member 20' and has secured thereto a screw nut 62 by fasteners 64. It will be noted from FIG. 5 that the plate 60 is bored as at 66 so that the threads on the screw nut 62 are exposed. A similar plate 60' of the screw nut cradle is secured at the opposite end to the screw nut 62. As to be more fully described hereinafter, the screw nut threadedly engages a lead screw 68.

Between the spaced plates 38 and above the top surface 46 of the channel member 20' is pivotally mounted the clamping arm 48 with the pivot pin therefor comprising fastener 40 which passes through bore 70 in the arm 48. The clamp arm 48 has two legs 72 and 74 with the one leg of a length greater than leg 74. The leg 72, as more clearly shown in FIG. 1, is first engaged by the inner beam or rail 76 of the illustrated ladder 16 as the transversely movable clamp member 36 is urged toward the fixed stop 22' by the lead screw, again as to be more fully described hereinafter. Upon contacting the outer surface of ladder rail 76, the leg 72 causes the clamping arm 48 to pivot downwardly until the rungs 80 are engaged by a crossbar 82 carried by a hanger 84 pivotally mounted to the end of leg 74 via pivot bolt 86.

It will be noted that the hanger 84 has a V-shaped leading edge 88 which will function to urge the ladder 16 either forwardly or rearwardly in the event one of the rungs 80 is directly below the apex of the V-point 88 thereby insuring that the crossbar 82 is firmly in contact with at least a pair of the rungs 80 as illustrated in FIGS. 2 and 4 of the drawings.

The clamping arm also includes an ear portion 90 which is bored as at 92 to receive one end 94 of a helical spring 96. The other end 98 of the spring 96 is connected to a pin 100 supported in bores in slide frames 38. The spring is such that when the transversely movable clamping member is moved away from its fixed stop member 22', the spring swings the clamping arm to, for example, the position shown in the right hand side of FIG. 1 to thereby free the ladder. In its most upwardly position as shown in the right hand portion of FIG. 1, the under surface of the ear 90 engages the spacer 42 between the pair of frames 38.

As hereinbefore discussed, the tranversely movable clamp member 36 is urged toward and away from the fixed end stop 22' by the rotation of the lead screw 68. The means for rotating the lead screw will be described primarily in reference to FIGS. 3, 7 and 8. The most extended end of the lead screw 102 is hexagonally shaped, as more clearly shown in FIG. 7, and the cylindrical portion 104 immediately preceding the hexagonal end 102 is journalled in a bearing element or bushing 106 immobilized in a sleeve 108 of the ratchet paw assembly 110.

The opposite end of the sleeve 108 carries a rachet bushing 112 which has journalled therein a stub shaft 114 having a square shaped internal opening 116 at one end, while the opposite end 118 has a hexagonal opening 120 sized to slip over the hexagonal end 102 of the lead screw 68. The square opening 116 in the stub shaft 114 receives square crank end 122 of crank 124 having a crank knob 126.

The squared end 122 of the crank 124 is maintained in its socket in the stub shaft 114 by a pin 128 whereby upon rotation of the crank 124 the stub shaft 114 is rotated in its bushings 112. About the portion 118 of the stub shaft 114 is welded a two step ratchet plate as more clearly shown in FIGS. 3 and 8. The stub shaft 114 and its ratchet plate 130 are continuously urged toward the fixed stop member 22' by a compression spring 132 which bears against a washer 134 seated against the inner end of the bearing or bushing element 106 for the lead screw 68.

The position of the ratchet plate 130 and its spacing from the inner peripheral surface of the bushing 112 is such that the spring 132 can not completely disengage the hexagonal opening in end 118 of the stub shaft 114 from the hexagonal end 102 of the lead screw 68. Thus rotation of the crank in either direction will transmit rotative motion to the lead screw 68 causing the transversely movable clamping member to move either toward or away from the fixed stop member 22'. However, the bushing 112 carries a ratchet pin 136 so that if the crank 124 is rotated counterclockwise, one of the two offset faces 138 engages the ratchet pin 136 preventing the lead screw 68 from rotating counterclockwise and thereby preventing the transversely movable clamp member 36 from moving away from the fixed stop 22' and thereby effectively preventing accidental release of the clamped elongate object.

Rotation of the crank 124 clockwise, however, causes the ratchet plate 130 to urge the stub shaft 114 and its attached crank toward the bushing 106 against the urging of the spring 132. Thus, the transversely movable clamp member 36 can always be cranked towards the fixed stop 22' and into tight clamping engagement with the ladder until the ladder is tightly pressed between the fixed stop, the movable stop and the crossbar 82 of the clamp arm 48.

In order for the operator to release the ladder clamp of the invention it is necessary that the crank 124 be pressed inwardly in the direction of directional arrows A, FIGS. 3 and 8, against the urging of spring 132 a distance such the the faces 138 on the ratchet plate 130 clear the ratchet pin 136. With the handle in the position illustrated in FIG. 8, the crank 124 can be rotated counterclockwise rotating the screw 68 such that the screw nut 62 causes the transversely movable clamp member 36 to move away from the fixed clamp 22' thus releasing the ladder or the like.

The stop member 22' comprises a pair of plate members 140 and a stop block or pad 142 which is secured between plate members. The plate members 140 are secured to the end of channel element or rail 20' by a pin 144 which passes through the side walls of plates 140, through the side walls of the channel, through a bore 146 in the sleeve 108 and the bearing or bushing 106 to thereby secure the ratchet assembly 110 and the fixed stop member 22' to the channel member 20'.

OPERATION

In operation of the improved elongate member carrying assembly, the operator presses the handle 124 in the direction of directional arrows A and rotates the crank counterclockwise to move the transversely movable clamp member 36 rearwardly a width greater than the width of the widest ladder to be placed on the rack. With the transversely movable clamping member 36 urged a sufficient distance away from the fixed stop member 22', a ladder is placed on the rack with one of the risers or rails adjacent the fixed stop members 22 and 22'. The operator then reverses the direction of turning of the crank 124 to urge the transversely movable clamping member 36 toward the fixed stop member 22' and in so doing the adjacent rail 76 of the ladder comes into engagement with leg 72 of the clamping arm 48 which causes the hold down crossbar to move downwardly into engagement with the ladder rungs 80 and at the same time urges the ladder tightly between leg 72 of the clamping arm 48 and the stop pad 142 of the fixed stop member 22'. The stop members 22 of the non-clamping bows 14 are also engaged by their respective ladder rails. It will be noted from FIG. 1 that even stacked ladders as shown in the left hand view of the drawing are effectively clamped by the clamping system of the invention.

From the foregoing description of a preferred and alternate embodiments of the present invention, it will be seen that the improved elongate object transporting means for vehicle roof fully accomplishes the aims and objects hereinbefore set forth and others that will be apparent to those skilled in the art.

I claim:

1. A vehicle top elongate object transporting structure comprising:

at least a pair of bows, each of said bows having means for attaching said bows to the top of a vehicle in logitudinally spaced relation;

each of said bows having an upstranding stop member immovably mounted at at least one end thereof; and at least one of said bows mounting a transversely movable clamp member comprising:
   a. a crank mounted for rotation in the end of said bow;
   b. a lead screw mounted for rotation in said bow and engageable by said crank;
   c. a slide frame engaging the bow and forming a part of the movable clamp member;
   d. a threaded follower engaging the lead screw and mounted in said slide frame;
   e. a generally U-shaped clamp arm having first and second legs; means pivotally mounting the clamp arm to the movable slide frame such that the legs of the arm generally depend toward the bow;
   f. a spring having one connected to the slide frame and the other end connected under tension to the U-shaped clamp arm adjacent the first leg to urge the first and second legs thereof away from the bow and about the pivotal connection between the clamp arm and the slide frame, so as to be pivoted in the opposite direction against the urging of the spring by contact of the first leg by an edge of an elongate object to be clamped to the bow when the slide frame is urged toward the elongate member;
   g. foot means carried by the free end of the second leg to engage the top surface of the elongate object to be transported when the clamp arm is in the clamping position;
   h. wherein movement of said slide frame towards the stop brings said first leg into engagement with the elongated object and causes the U-shaped clamp to be pivoted, continued movement of the slide frame continues pivoting of the U-shaped clamp until the foot means carried by the second leg engages the upper surface of the elongated object to thereby effectively clamp the object against vertical and horizontal movement.

2. The invention defined in claim 1 further including a spring urged ratchet assembly mounted between said crank and said lead screw normally preventing rotation of the lead screw in a direction to move the transversely movable clamp member away from the immovable stop member.

3. The invention defined in claim 2 including means for disengaging said ratchet assembly to thereby permit rotation of the lead screw to move the transversely movable clamp member in a direction away from the immovable stop member.

4. The invention defined in claim 1 including an assembly of three bows, the center bow of which mounts said transversely movable clamp member.

5. The invention defined in claim 4 wherein each of said bows has an upstanding stop member immovably mounted at each end; and wherein said center bow mounts a pair of transversely movably clamp members.

6. The invention defined in claim 1 wherein said foot means carried by the free end of the second leg of said clamp arm is mounted for pivotal movement on an axis transverse to the longitudinal axis of the second leg.

7. The invention defined in claim 6 wherein said pivotally mounted foot means has a clamping bar secured thereto which bar has its longitudinal axis directed generally normal to the longitudinal axis of the bow mounting the transversely movable clamp member.

* * * * *